(12) United States Patent
Zhu et al.

(10) Patent No.: US 11,144,387 B2
(45) Date of Patent: Oct. 12, 2021

(54) APPARATUS, SYSTEMS, AND METHODS TO DETECT AND/OR CORRECT BIT ERRORS USING AN IN BAND LINK OVER A SERIAL PERIPHERAL INTERFACE

(71) Applicant: Intel Corporation, Santa Clara, CA (US)

(72) Inventors: Zhenyu Zhu, Folsom, CA (US); William A. Stevens, Jr., Folsom, CA (US); Michael T. Klinglesmith, Portland, OR (US); Mikal Hunsaker, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 101 days.

(21) Appl. No.: 16/398,076

(22) Filed: Apr. 29, 2019

(65) Prior Publication Data
US 2019/0258539 A1    Aug. 22, 2019

(51) Int. Cl.
*G06F 11/10* (2006.01)
*G06F 13/16* (2006.01)
*G06F 13/42* (2006.01)

(52) U.S. Cl.
CPC ...... *G06F 11/1048* (2013.01); *G06F 13/1668* (2013.01); *G06F 13/4282* (2013.01)

(58) Field of Classification Search
CPC ............. G06F 11/1048; G06F 13/1668; G06F 13/4282
USPC ....................................................... 714/764
See application file for complete search history.

(56) References Cited

U.S. PATENT DOCUMENTS

2009/0103380 A1* 4/2009 Pekny .................. G06F 3/0679
                                                      365/201
2012/0011424 A1   1/2012 Schuette

FOREIGN PATENT DOCUMENTS

CN        1838311 A      9/2006
DE   102007028767 A1    12/2008

OTHER PUBLICATIONS

Extended European Search Report dated Sep. 25, 2020 for EP Application No. 20163966.3, 7 pages.

* cited by examiner

*Primary Examiner* — James C Kerveros
(74) *Attorney, Agent, or Firm* — Schwabe, Williamson & Wyatt, P.C.

(57) ABSTRACT

Embodiments include a serial bus controller that may be coupled to an in band serial peripheral interface (SPI) link, to request a write of data and a subsequent read of the data from a memory device and in response to the request to read the data, receive a bit error report and optionally correct the bit error over the in band SPI link. Embodiments include a memory device, e.g., a flash memory device, to detect and report the bit error over the in band SPI link, where the flash memory device, in response to a request to write and/or erase data, calculates or determines an error correction code (ECC) and stores corresponding parity data. In embodiments, after receiving a subsequent request to read the data, the flash memory device accesses the stored parity data to check the ECC for a bit error and if a bit error is detected, reports the detected bit error over the in band SPI link. Other embodiments may be described and claimed.

15 Claims, 5 Drawing Sheets

US 11,144,387 B2

APPARATUS, SYSTEMS, AND METHODS TO DETECT AND/OR CORRECT BIT ERRORS USING AN IN BAND LINK OVER A SERIAL PERIPHERAL INTERFACE

FIELD

Embodiments of the present disclosure generally relate to the field of computing, and more specifically to detecting and correcting bit errors over a serial peripheral interface (SPI).

BACKGROUND

Original Equipment Manufacturers (OEMs) and purchasers of non-volatile memory products, e.g., flash memory, are reporting high numbers of system failures. For example, costs due to serial peripheral interface (SPI) flash problems related to device wear-out exceed tens of millions of dollars each year. Flash devices on shipped systems can experience single or multiple bit errors after only one year of use. Random system failures may occur depending on where the bit errors are located. The failing systems are returned by customers and subsequently repaired by the OEMs/computer repair centers. Unfortunately, the root causes of the failures are not straightforward because there is no standard mechanism to detect a flash bit error.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
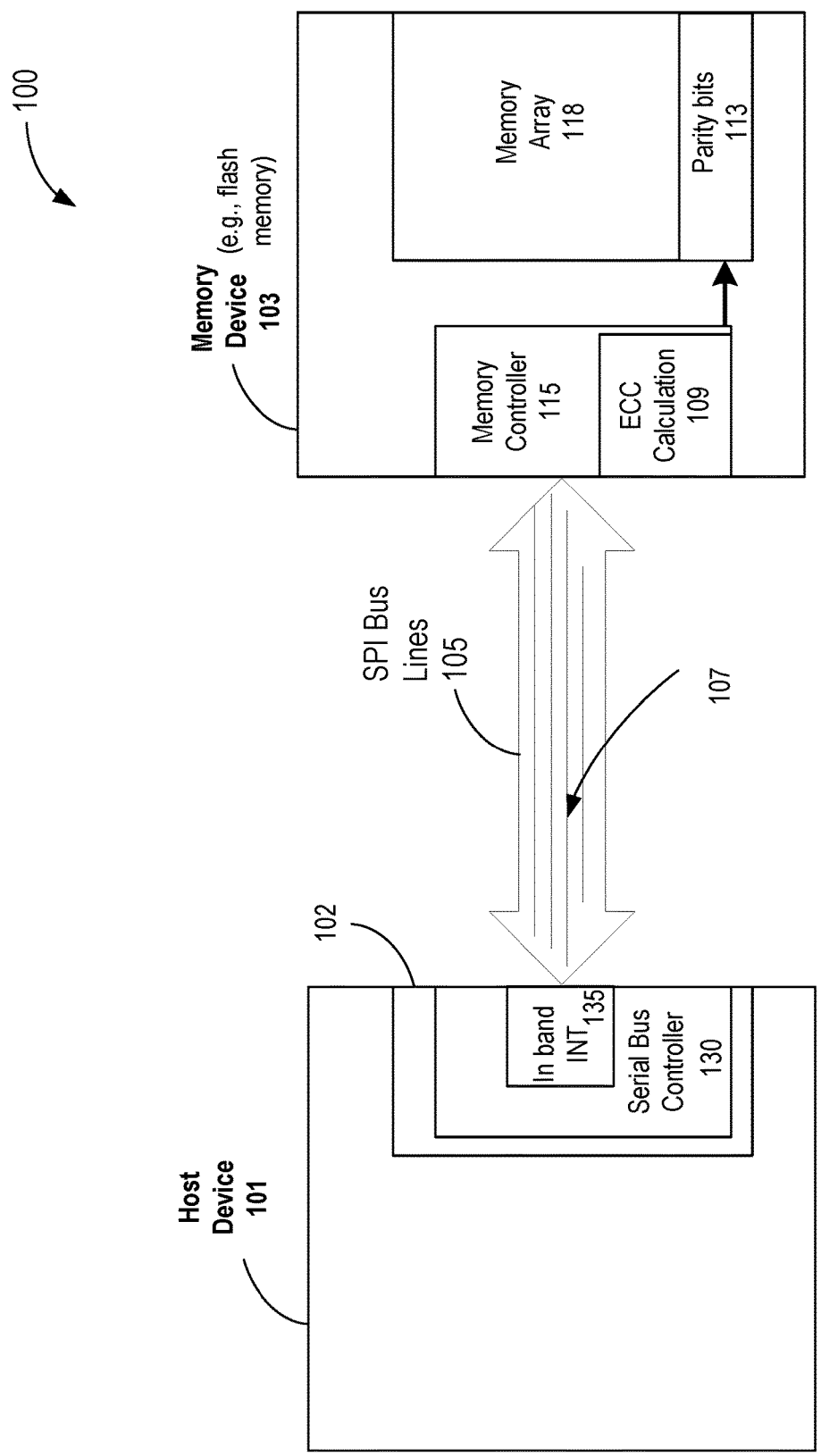
FIG. 1 illustrates an example embodiment associated with detection and correction of bit errors in a serial bus environment, according to embodiments of the present disclosure.

Embodiments of the present disclosure are directed toward apparatus, methods, and systems for in band detection and correction of bit errors in a serial bus environment. In embodiments, a serial bus controller associated with a host or master device (hereinafter "host device") is linked by one or more serial peripheral interface (SPI) bus lines to a memory controller of, e.g., a slave memory device (hereinafter "memory device"), such as a flash memory. Accordingly, in embodiments, the memory controller detects and reports a bit error over an in band link of the one or more SPI bus lines. In embodiments, the memory device or memory controller performs run-time error correction code (ECC) generation on write operations of data and performs corresponding ECC checks upon read operations. In embodiments, the memory controller reports the bit error on an in band error interrupt signal, e.g., on a Master In/Slave Out (MISO) line of the one or more SPI bus lines. Furthermore, in embodiments, in response, the host controller optionally corrects the bit error over the in band link. Accordingly, in embodiments, existing in band links are used in the detection, reporting, and correction of the bit error, without a need for the addition of pins on a chipset or flash memory device. Additional embodiments may be described and/or claimed.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 illustrates an example embodiment associated with detection and correction of bit errors in a serial bus environment, according to embodiments of the present disclosure. As noted above, embodiments of the present disclosure are associated with detection and correction of bit errors in a serial bus environment 100, e.g., an SPI environment. Environment 100 illustrates an example serial bus controller 130 of a host device 101, e.g., that may include or be included on a chipset or system on a chip (SoC), coupled to a flash memory or memory device 103. In embodiments, serial bus controller 130 includes a logic unit to include one or more of circuitry, firmware, other software, and the like and/or processor to perform various operations described herein. In embodiments, host device 101 is coupled at a port 102 to a memory controller 115 of memory device 103 via one or more SPI bus lines 105. In embodiments, memory device 103 includes a memory array 118. In embodiments, as will be discussed further below, the ECC and parity data or bits resulting from an error correction code (ECC) calculation or determination 109 (performed by, e.g., an ECC engine, logic unit, or processor of memory controller 115) is stored in an area 113 of memory array 118.

Accordingly, in embodiments, serial bus controller 130 requests over an in band link 107 a write of data and later, a subsequent read of the data. In embodiments, in response to the request to read the data, serial bus controller 130 receives a report that indicates a bit error in the data. In embodiments, serial bus controller 130 receives an in band interrupt signal 135 reported over a MISO line of the one or more SPI bus lines 105. As will be further discussed below, in embodiments, on a memory device side, memory device 103 accesses the stored ECC. Accordingly, memory device 103 determines the bit error based upon the error correction code (ECC) checked during one or more run-time read operations performed in response to the request to read the data. In embodiments and discussed in more detail below, serial bus controller 130 optionally corrects the bit error over the in band link. Note that although FIG. 1 illustrates a single host device to single memory device, SPI environment 100 may include a single host device and one or more memory devices coupled in any suitable configuration where detection and correction of bit errors can occur over an existing in band SPI link.

Figure 2:
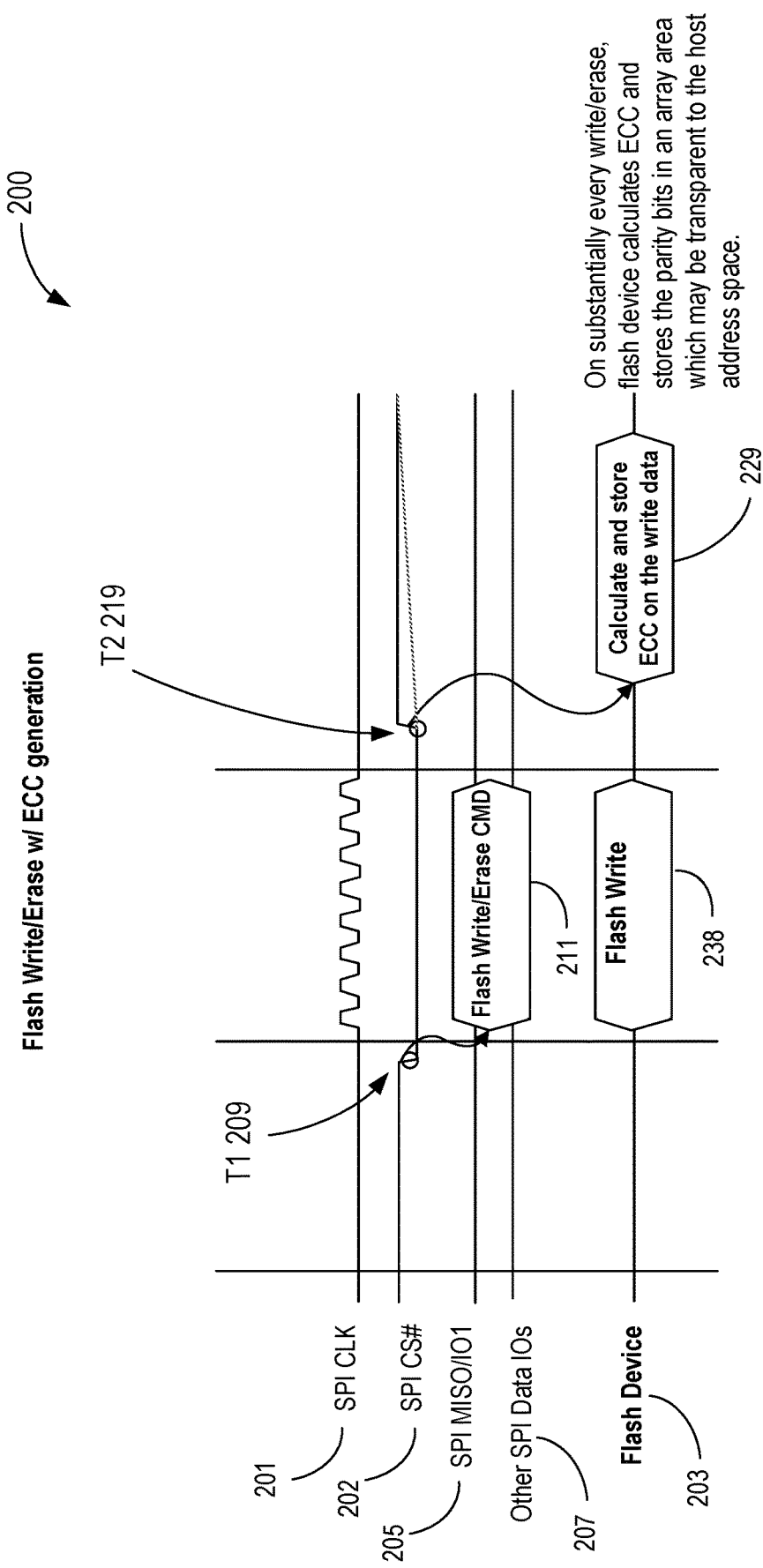
FIG. 2 is an example timing/function diagram associated with a write operation and error correction code (ECC) generation in the serial bus environment of FIG. 1, according to embodiments of the present disclosure.
Figure 3:
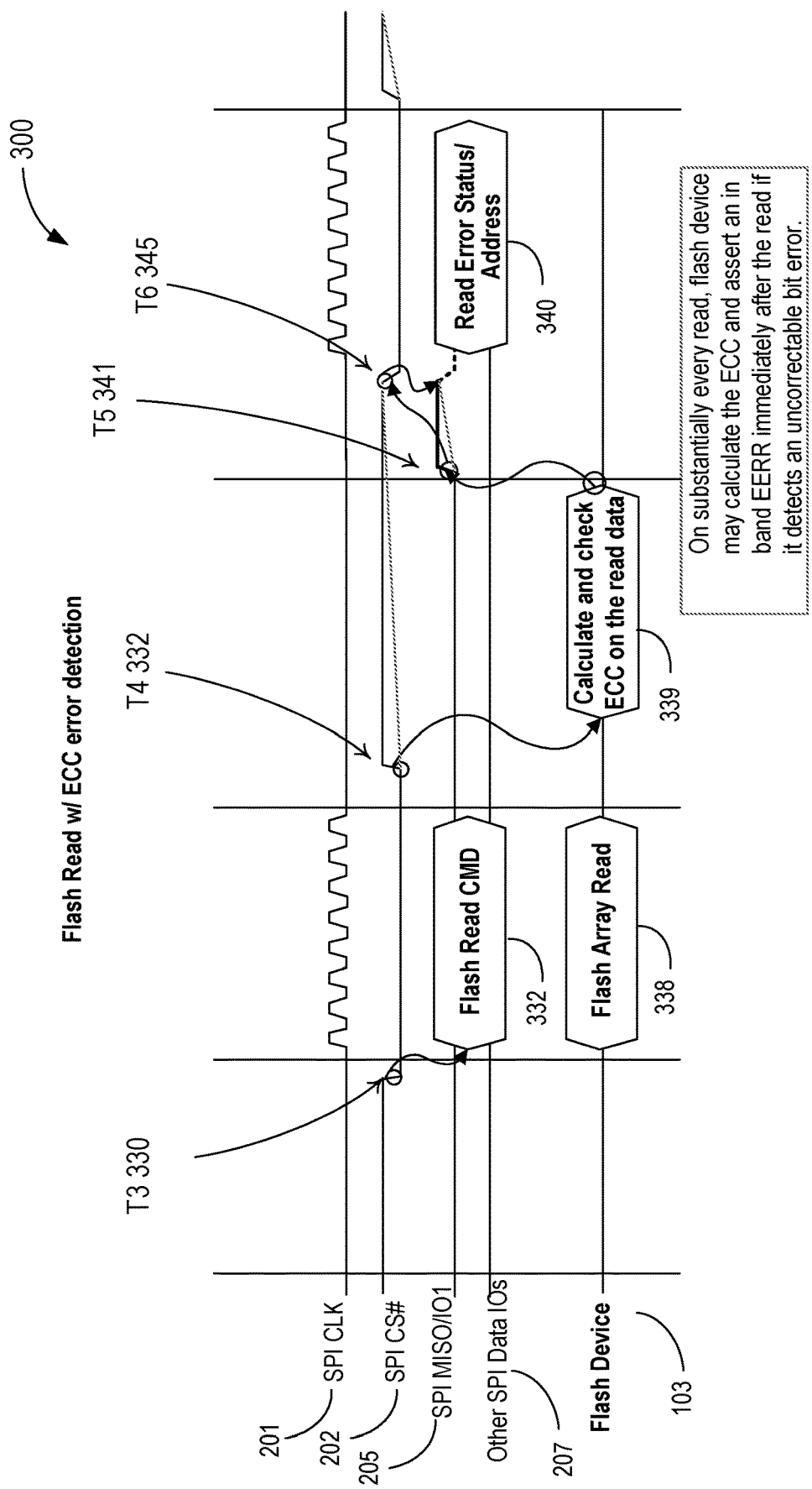
FIG. 3 is an example timing/function diagram associated with a subsequent read operation and error detection corresponding to the write operation of FIG. 2, according to embodiments of the present disclosure.

In embodiments, FIGS. 2 and 3 illustrate an example protocol associated with one or more SPI bus lines coupled between a serial bus controller of a host and a memory controller of an example memory device 103, e.g., flash device of FIG. 1.

FIG. 2 is an example timing/function diagram 200 associated with a request for a write or write/erase operation and corresponding generation of an ECC as discussed with respect to FIG. 1. In embodiments, diagram 200 illustrates a timing/function of a clock signal (e.g., SPI CLK 201), a device select or chip select (CS, also known as slave select (SS)) signal (e.g., SPI CS #202), an input/output (I/O) signal (e.g., SPI MISO/I/O1 205), and a data I/O signal (e.g., Other SPI data I/Os or also referred to herein as "I/O2 207") associated with a host interface or port 102 of a host device e.g., a host device 101 including serial bus controller 130 of FIG. 1. Corresponding function/timing of a memory device similar to memory device 103 of FIG. 1, e.g., flash device 203, is shown at the bottom of diagram 200. In embodiments, as host device 101 at T1 209 selects flash device 203, SPI CS #202 goes low. Shortly thereafter, host device 101 requests over an in band link a write of data by issuing a flash write/erase command (e.g., Flash Write/Erase CMD 211) over SPI MISO/IO1 205 and SPI data I/O2 207. Accordingly, during a similar time window, in embodiments, flash device 203 performs a write operation of data (e.g., flash write 238) into a memory array, such as, e.g., memory array 118 of FIG. 1. In embodiments, in a subsequent time window, at approximately T2 219, after the write operation of data is completed and SPI CS #202 goes high, flash device 203 calculates and/or determines an error correction code (ECC) and then stores the ECC on the write data at 229. Accordingly, flash device 203 stores parity data (e.g., parity bits 113) into a memory array, e.g., flash memory array (or memory array 118 of FIG. 1). Accordingly, in embodiments, flash device 203 (or flash or memory controller 115) calculates the ECC and stores parity data or bits during or after a write time of the data and in a memory array area. In embodiments, the memory array area is transparent to a host address space.

FIG. 3 is an example timing/function diagram associated with a subsequent read operation and error detection corresponding to the write operation of FIG. 2, according to embodiments of the present disclosure. In particular, timing/function diagram 300 of FIG. 3 illustrates a subsequent read operation of data and corresponding ECC error detection. FIG. 3 includes the signals of FIG. 2, e.g., clock signal (e.g., SPI CLK 201), device select or chip select (CS) signal (e.g., SPI CS #202), input/output (I/O) signal (e.g., SPI MISO/IO1 205), and data I/O signal (e.g., other SPI data I/O 207). Corresponding function/timing of, e.g., flash device 203 is shown at the bottom of diagram 300. In embodiments, host device 101 requests a subsequent read of the data written in the operations (e.g., see flash write 238) of FIG. 2. Accordingly, in embodiments, as shown at T3 330, SPI CS #202 signal goes low as, e.g., serial bus controller 130 of host device 101 selects and issues a flash read command 332 to flash device 203 on, e.g., SPI data IO2 207 (also known in some embodiments as Master Out/Slave In or MOSI I/O). In embodiments, as shown, flash device 203 performs a flash array read at 338. In embodiments, at a time T4 332, SPI CS #202 returns to high after flash read command 332 is issued and flash array read 338 is complete.

Accordingly, after receiving a subsequent request to read the data, flash device 203 accesses stored parity data to check the ECC and if a bit error is detected in the data, reports the detected bit error over an in band link. Thus, after a timing window associated with the flash read command is over, at T4 332, flash device 203 calculates and checks the ECC on the read data at 339. In embodiments, if a bit error is detected, flash device 203 reports the detected bit error on an in band error interrupt signal over a MISO line. For example, at a time T5 341, flash device 203 reports the bit error using an in band error interrupt signal, e.g., over SPI MISO/IO1 205. In some embodiments, the signal is an in band error signal (e.g., block erase signal or sometimes abbreviated as, e.g., EERR block erase signal). In embodiments, the flash device or flash memory further stores an address at which a last bit error is detected in an address register, e.g., flash register. Next, in embodiments, SPI CS #202 goes low at T6 345 and host device 101 sends an in band read_status command (Read Error Status/Address 340) to read the address register to find out where the last bit error is located. In embodiments, the read_status command and corresponding responses are transmitted over, e.g., SPI MISO/IO1 205 and SPI data I/O 207.

Note that the above timing diagrams 200 and 300 are merely examples, and although they may depict particular pins or signals (e.g., SPI MISO/IO1) and their corresponding signals as high or low, alternative signal names and states are contemplated within the scope of the embodiments.

As noted above, in embodiments, flash device 203 further stores an address at which a last bit error is detected in an address register, e.g., flash register of a memory array. In embodiments, the memory device or flash device 203 reports the detected bit error to a host over an in band error interrupt signal whether the bit error is correctable or uncorrectable. Accordingly, in embodiments, the host device optionally corrects the bit error over the in band link including to access an address of the bit error in the flash register using an in band read status signal. In some embodiments, flash device 203 corrects the bit error upon receiving a command to reprogram data in an address register. In other embodiments, after the flash memory reports the detected bit error, the flash memory executes an in band reset or abort read command. In some embodiments, the in band reset function is a command code to abort read or write operations in the flash memory and may also be sent over an in band line, such as utilizing in band commands over, e.g., SPI MISO/IO1 205 and SPI data I/O 207 signals.

Figure 4:
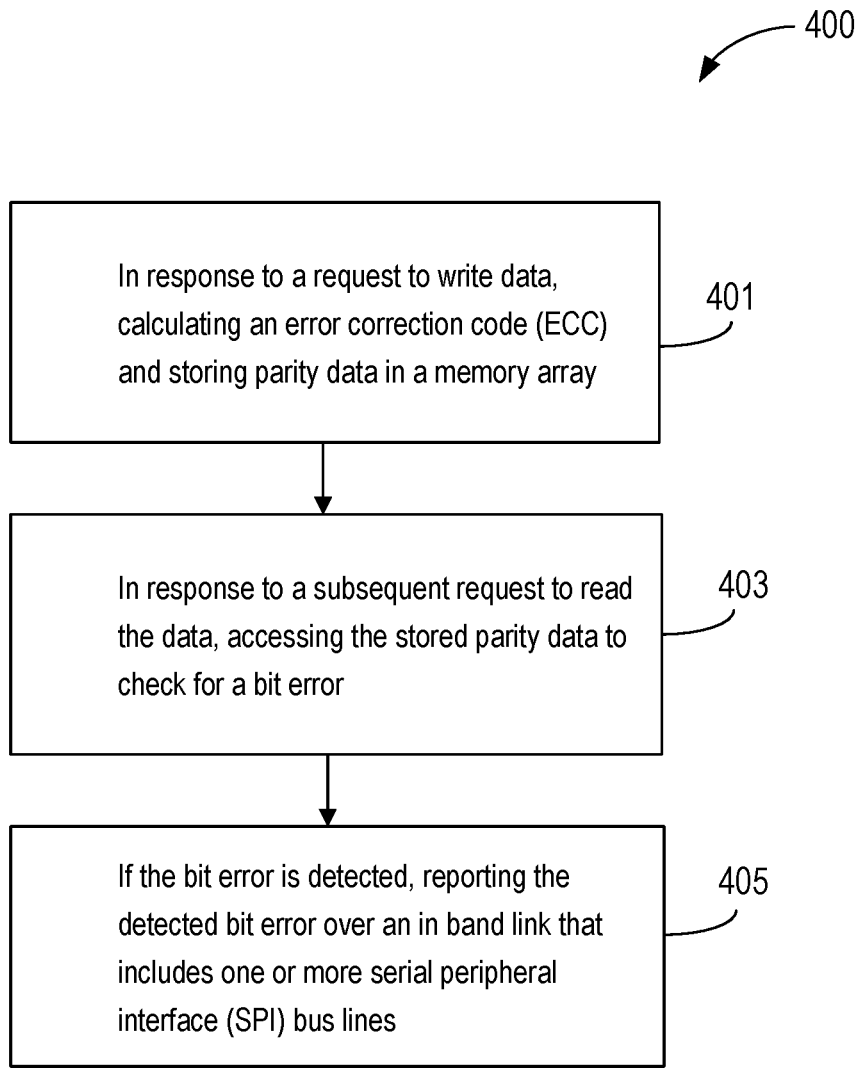
FIG. 4 is an example flow diagram illustrating the process of detecting and reporting a bit error in a memory device, according to embodiments of the present disclosure.

FIG. 4 is an example flow diagram illustrating a method of detecting and reporting a bit error in a memory device, according to embodiments of the present disclosure. Method 400 may be practiced by any suitable memory device or memory controller that may perform run-time error correction code (ECC) generation on write operations of data and corresponding ECC checks upon read operations, and in embodiments, report the bit error on an in band error interrupt signal over a serial bus line, e.g., SPI bus line. At block 401, the memory controller, in response to a request to write and/or erase data, calculates an error correction code (ECC) and stores parity data in a memory array, e.g., flash memory array. In embodiments, the memory controller calculates the ECC and stores the parity data during or after a write time of the data and in a memory array area transparent to a host address space. At block 403, in embodiments, after receiving a subsequent request to read the data, the memory controller accesses the stored parity data to check for a bit error. Next, at block 405, if a bit error is detected, the memory controller reports the detected bit error over the in band link. Note that in some embodiments, the memory controller reports the detected bit error to a host over an in band error interrupt signal regardless of whether the bit error is correctable or uncorrectable. In embodiments, the memory controller stores an address at which a last bit error is detected in a memory register, e.g., a flash register coupled to the flash memory controller. Note that on a host device side, a host bus controller issues an in band read command to determine an address of the bit error and a subsequent command to reprogram. Accordingly, in some embodiments, method 400 includes correcting, by the memory controller, the bit error upon receiving a command to reprogram or correct the contents of an address in a memory register.

Figure 5:
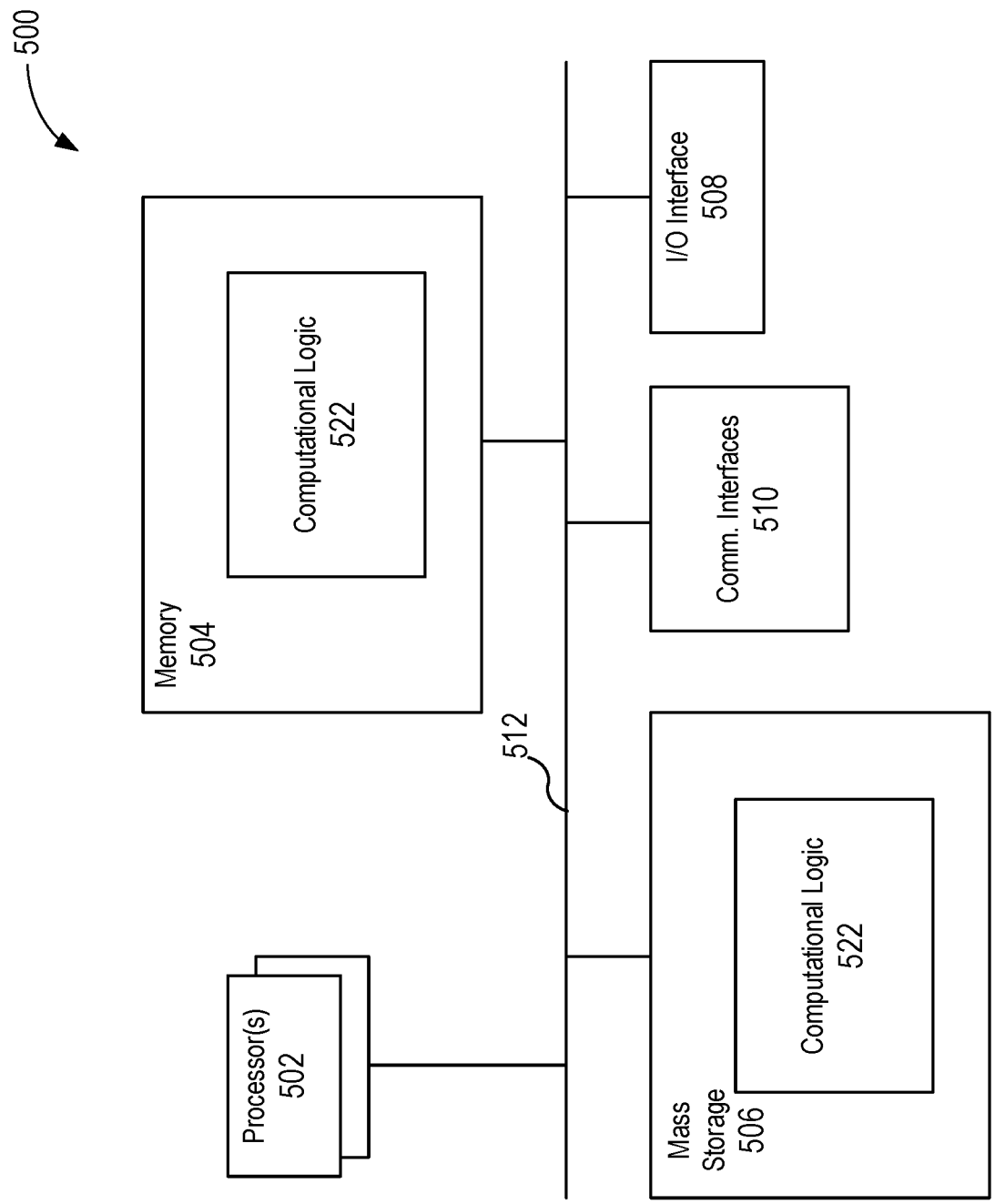
FIG. 5 illustrates an example computing device, in accordance with various embodiments.

FIG. 5 illustrates an example computing device 500 that may include a host device and/or memory device of FIGS. 1-4, in accordance with various embodiments. Specifically, in some embodiments, the computing device 500 may include a host device that includes a serial bus controller, e.g., SPI host controller, of the present disclosure linked by one or more serial peripheral interface (SPI) bus lines to a memory controller of one or more memory devices. In various embodiments, the serial bus controller and memory controller of the present disclosure, for example, are implemented as hardware, firmware, software, or some combination thereof.

As shown, computing device 500 may include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor. The computing device 500 may include mass storage devices 506 (such as diskette, hard drive, volatile memory (e.g., dynamic random-access memory (DRAM), compact disc read-only memory (CD-ROM), digital versatile disk (DVD), and so forth). In general, system memory 504 and/or mass storage devices 506 may be temporal and/or persistent storage of any type, including, but not limited to, volatile and non-volatile memory, optical, magnetic, and/or solid state mass storage, and so forth. In embodiments, mass storage devices 506 include one or more of, e.g., memory device 103 or flash device 203, of respective FIGS. 1 and 2. Volatile memory may include, but is not limited to, static and/or dynamic random-access memory. Non-volatile memory may include, but is not limited to, electrically erasable programmable read-only memory, phase change memory, resistive memory, and so forth.

The computing device 500 may further include input/output (I/O) interface 508 to receive one or more I/O devices (such as a display (e.g., a touchscreen display), keyboard, cursor control, remote control, gaming controller, image capture device, and so forth) and communication interfaces 510 (such as network interface cards, modems, infrared receivers, radio receivers (e.g., Bluetooth), and so forth). In embodiments, I/O interface 508 includes any suitable interfaces between blocks of computing device 500, e.g., port 102 of FIG. 1. The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. One or more buses may include a serial bus line, e.g., SPI bus line on which in band links and/or signals may be transmitted to detect and correct a bit error in a memory device, in accordance with embodiments as described in connection with FIGS. 1-4. In particular, system memory 504 and mass storage devices 506 may include memory device 103 of FIG. 1, e.g., a non-volatile memory or flash memory device, to correct and report the bit error over an in band link. Note that system memory 504 and mass storage devices 506 may be employed to store a working copy and a permanent copy of the programming instructions for implementing the operations of an operating system or one or more applications, collectively referred to as computational logic 522. The various elements may be implemented by assembler instructions supported by processor(s) 502 or high-level languages that may be compiled into such instructions.

The permanent copy of the programming instructions may be placed into mass storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

For one embodiment, at least one of processors 502 may be packaged together with computational logic 522 to form a System in Package (SiP) or a System on Chip (SoC). For example, in embodiments, an SoC may include a host device, e.g., host device 101 including an SPI controller to receive a report of a detected bit error over an in band link and to optionally correct a bit error over the in band link as described in connection with FIGS. 1-4.

In various implementations, the computing device 500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 500 may be any other electronic device that processes data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer-readable media. The computer program product may be a computer storage medium readable by a computer system and encoding a computer program instructions for executing a computer process.

The corresponding structures, material, acts, and equivalents of all means or steps plus function elements in the claims below are intended to include any structure, material, or act for performing the function in combination with other claimed elements and are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Some non-limiting Examples are provided below:

Example 1 is an apparatus, comprising a port to be coupled to an in band link including one or more serial peripheral interface (SPI) bus lines to couple the apparatus with a memory device; and a serial bus controller to couple to, or include, the port and to request, over the in band link, to the memory device, a write of data and a subsequent read of the data; and in response to the request to read the data, the serial bus controller is to: receive, from the memory device, a report that indicates a bit error in the data; and optionally correct the bit error over the in band link.

Example 2 is the apparatus of Example 1, wherein the serial bus controller is an SPI host controller and wherein the memory device is a flash memory device.

Example 3 is the apparatus of Example 1, wherein the serial bus controller is to receive the report via an in band error interrupt signal over one or more SPI bus lines.

Example 4 is the apparatus of Example 1, wherein the bit error is determined by the memory device based upon an error correction code (ECC) checked during one or more run-time read operations performed in response to the request to read the data.

Example 5 is the apparatus of Example 1, wherein the serial bus controller to correct the bit error includes to issue an in band read command to the memory device to determine an address of the bit error to correct contents of the address.

Example 6 is the apparatus of Example 1, further comprising to abort, by the serial bus controller, one or more read or write operations via an in band signal or command in response to an in band reset signal or command received from a memory device.

Example 7 is the apparatus of Example 3, wherein the in band error interrupt signal includes an error block erase signal.

Example 8 is the apparatus of any one of Examples 1-7, wherein the serial bus controller, to optionally correct the bit error over the in band link, includes to access an address of the bit error in a flash memory register using an in band read status signal.

Example 9 is a memory controller to detect and report a bit error in a memory device over an in band link, comprising: a port to be coupled to the in band link, wherein the in band link includes one or more serial peripheral interface (SPI) bus lines; and a logic unit coupled to the port to in response to an in band request to write and/or erase data, calculate or determine an error correction code (ECC) and store parity data in the memory device coupled to the processor; and after receiving a subsequent request to read the data, access the stored parity data to check the ECC for a bit error in the data and if a bit error is detected, report the detected bit error over the in band link.

Example 10 is the memory controller of Example 9, wherein the logic unit is to calculate or determine the ECC and store the parity data during or after a write time of the data and store the parity data in a memory array area transparent to a host address space.

Example 11 is the memory controller of Example 9, wherein the memory device is a flash memory and if the bit error is detected, the logic unit is to store an address at which a last bit error is detected in a register of the memory device.

Example 12 is the memory controller of Example 9, wherein if the bit error is detected, the memory controller is to report the detected bit error to a host over an in band error interrupt signal whether the bit error is correctable or uncorrectable.

Example 13 is the memory controller of any one of Examples 9-12, wherein if the bit error is detected, the memory controller is to report the detected bit error on an in band error interrupt signal over one or more SPI bus lines.

Example 14 is the memory controller of Example 13, wherein after the memory controller is to report the detected bit error, the logic unit to generate an in band reset or abort read command to be sent over the one or more SPI bus lines.

Example 15 is a method to detect a bit error, comprising: in response to a request to write data, calculating or determining, by a memory controller of a memory device, an error correction code (ECC) and storing parity data in the memory device; in response to a subsequent request to read the data, accessing, by the memory controller, the stored parity data to check for the bit error; and if the bit error is detected, reporting, by the memory controller, the detected bit error over an in band link that includes one or more serial peripheral interface (SPI) bus lines.

Example 16 is the method of Example 15, wherein if the bit error is detected, the reporting of the detected bit error comprises sending to the host device, by the memory controller, an interrupt signal over the in band link.

Example 17 is the method of Example 16, further comprising, correcting, by the memory controller, the bit error upon receiving a command to reprogram data in a memory register.

Example 18 is the method of Example 15, wherein the memory controller comprises a flash memory controller of a flash memory device.

Example 19 is the method of Example 15, wherein reporting the detected bit error includes sending an error report, by the memory controller, if the bit error has been corrected.

Example 20 is the method of Example 15, wherein if the bit error is detected, further comprising generating an in band reset or abort read command to be sent over the one or more SPI bus lines.

Example 21 is the method of Example 15, wherein calculating or determining the ECC and storing the parity data occurs during or after a write time of the data by the memory controller.

Example 22 is the method of any one of Examples 15-21, wherein if the bit error is detected, further comprising reporting the bit error over one or more SPI bus lines.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus, comprising:
   a port coupleable to an in band link including one or more serial peripheral interface (SPI) bus lines to couple the apparatus with a memory device; and
   a serial bus controller, coupleable to or including the port, to request, over the in band link, to the memory device, a write of data and a subsequent read of the data; and
   in response to the request to read the data, the serial bus controller is to:
   receive, from the memory device, a report that indicates a bit error in the data, wherein the report is received via an in band error interrupt signal over one or more of the SPI bus lines; and optionally correct the bit error over the in band link, by issuing a command to the memory device to reprogram contents of an address in the memory device if the bit error is to be corrected or issuing in band reset command to the memory device to abort read or write functions, if the bit error is to remain uncorrected.

2. The apparatus of claim 1, wherein the serial bus controller is an SPI host controller and wherein the memory device is a flash memory device.

3. The apparatus of claim 1, wherein the bit error is determined by the memory device based upon an error correction code (ECC) checked during one or more run-time read operations performed in response to the request to read the data.

4. The apparatus of claim 1, wherein the serial bus controller to correct the bit error includes to issue an in band read command to the memory device to determine an address of the bit error to correct contents of the address.

5. The apparatus of claim 1, wherein the in band error interrupt signal includes an error block erase signal.

6. The apparatus of claim 1, wherein the serial bus controller, to optionally correct the bit error over the in band link, includes to access an address of the bit error in a flash memory register using an in band read status signal.

7. A memory controller to detect and report a bit error in a memory device over an in band link, comprising:
a port coupleable to the in band link, wherein the in band link includes one or more serial peripheral interface (SPI) bus lines; and
a logic unit coupled to the port to:
in response to an in band request to write and/or erase data, calculate or determine an error correction code (ECC) and store parity data in the memory device coupled to a processor; and
after receiving a subsequent request to read the data, access the stored parity data to check the ECC for a bit error in the data and if a bit error is detected, report to a serial bus controller of a master or host device the detected bit error on an in band error interrupt signal over the one or more SPI bus lines, wherein as part of an optional correction of the bit error by the serial bus controller, if the bit error is to be corrected, the logic unit receives from the serial bus controller, a command to reprogram contents of an address in the memory device, or if the bit error is to remain uncorrected, the logic unit receives from the serial bus controller a band reset command to abort read or write functions.

8. The memory controller of claim 7, wherein the logic unit is to calculate or determine the ECC and store the parity data during or after a write time of the data and store the parity data in a memory array area transparent to a host address space.

9. The memory controller of claim 7, wherein if the bit error is detected, the logic unit is to store an address at which a last bit error is detected in a register of the memory device.

10. The memory controller of claim 7, wherein if the bit error is detected, the logic unit is to report the detected bit error to a host over the in band error interrupt signal whether the bit error is correctable or uncorrectable.

11. A method to detect a bit error, comprising:
in response to a request to write data, calculating or determining, by a memory controller of a memory device, an error correction code (ECC) and storing parity data in the memory device;
in response to a subsequent request to read the data, accessing, by the memory controller, the stored parity data to check for the bit error;
if the bit error is detected, reporting to a serial bus controller of a host device, by the memory controller, the detected bit error over an in band error interrupt signal over one or more serial peripheral interface (SPI) bus lines, wherein as part of an optional correction of the bit error, receiving, by the memory controller, a command to reprogram contents of an address in the memory device if the bit error is to be corrected, or receiving a band reset command to abort read or write functions if the bit error is to remain uncorrected.

12. The method of claim 11, wherein if the bit error is detected, the reporting of the detected bit error comprises sending to the host device, by the memory controller, an interrupt signal over an in band link.

13. The method of claim 12, further comprising, correcting, by the memory controller, the bit error upon receiving a command to reprogram data in a memory register.

14. The method of claim 11, wherein the memory controller comprises a flash memory controller of the memory device.

15. The method of claim 11, wherein reporting the detected bit error includes sending an error report, by the memory controller, if the bit error has been corrected.

* * * * *

UNITED STATES PATENT AND TRADEMARK OFFICE
CERTIFICATE OF CORRECTION

| | |
|---|---|
| PATENT NO. | : 11,144,387 B2 |
| APPLICATION NO. | : 16/398076 |
| DATED | : October 12, 2021 |
| INVENTOR(S) | : Zhenyu Zhu et al. |

It is certified that error appears in the above-identified patent and that said Letters Patent is hereby corrected as shown below:

In the Claims

Column 11:
Line 4, in Claim 1, "... issuing in band" should read -- issuing an in band --

Line 38, in Claim 7, "... a master or host device" should read -- a host device --

Line 42, in Claim 7, "... controller," should read -- controller --

Signed and Sealed this
Fourth Day of April, 2023

Katherine Kelly Vidal
*Director of the United States Patent and Trademark Office*